United States Patent
Miloiu et al.

(10) Patent No.: US 9,619,368 B2
(45) Date of Patent: Apr. 11, 2017

(54) METHOD OF TESTING SOFTWARE

(71) Applicants: Dragos Miloiu, Banesti (RO); Alexandru Cosmin Gheorghe, Com Poeni (RO); Radu Theodor Lazarescu, Bucharest (RO); Mihail-Marian Nistor, Bucharest (RO)

(72) Inventors: Dragos Miloiu, Banesti (RO); Alexandru Cosmin Gheorghe, Com Poeni (RO); Radu Theodor Lazarescu, Bucharest (RO); Mihail-Marian Nistor, Bucharest (RO)

(73) Assignee: NXP USA, INC., Austin, TX (US)

(*) Notice: Subject to any disclaimer, the term of this patent is extended or adjusted under 35 U.S.C. 154(b) by 0 days.

(21) Appl. No.: 14/672,422

(22) Filed: Mar. 30, 2015

(65) Prior Publication Data

US 2016/0224454 A1    Aug. 4, 2016

(30) Foreign Application Priority Data

Jan. 29, 2015  (RO) .............................. A 2015 00065

(51) Int. Cl.
    *G06F 11/36*   (2006.01)
    *G06F 9/44*    (2006.01)
(52) U.S. Cl.
    CPC ........ *G06F 11/364* (2013.01); *G06F 11/3664* (2013.01)
(58) Field of Classification Search
    CPC ..................... G06F 11/364; G06F 11/3664
    USPC ................................................... 717/129
    See application file for complete search history.

(56) References Cited

U.S. PATENT DOCUMENTS

| 5,790,846 | A | 8/1998 | Mealey et al. |
| 6,263,489 | B1* | 7/2001 | Olsen ................. G06F 11/3628 714/E11.209 |
| 6,587,967 | B1 | 7/2003 | Bates et al. |
| 6,681,384 | B1 | 1/2004 | Bates et al. |
| 7,506,206 | B2 | 3/2009 | Pedersen |
| 7,552,425 | B2 | 6/2009 | Bates et al. |
| 7,574,585 | B1 | 8/2009 | Nekl |
| 7,827,540 | B2* | 11/2010 | Lien .................... G06F 11/3664 713/2 |

(Continued)

FOREIGN PATENT DOCUMENTS

WO    2015079291 A1    6/2015

OTHER PUBLICATIONS

Buck et al., "An API for Runtime Code Patching", ACM International Journal of High Performance Computing Applications, 2000, 12pg.*

(Continued)

*Primary Examiner* — Ryan Coyer

(57) ABSTRACT

A method of testing software uses a debugger and a breakpoint handler. The debugger inserts a breakpoint in a target application and enters at least one filtering condition associated with the breakpoint in a data structure. When during execution the target application encounters a breakpoint at an address, the target application transfers execution to the breakpoint handler. The breakpoint handler uses the address to retrieve filtering conditions from the data structure, executes code for evaluating the filtering condition, and transfers execution back to the target application if the filtering condition is not met.

14 Claims, 7 Drawing Sheets

(56) References Cited

U.S. PATENT DOCUMENTS

| | | | |
|---|---|---|---|
| 8,091,075 B2 * | 1/2012 | Bates | G06F 11/3612 714/25 |
| 8,117,587 B1 | 2/2012 | Testardi | |
| 8,635,603 B2 | 1/2014 | Gooding et al. | |
| 8,756,577 B2 | 6/2014 | Bates | |
| 8,832,666 B2 | 9/2014 | Singh et al. | |
| 2002/0199173 A1 | 12/2002 | Bowen | |
| 2003/0154430 A1 | 8/2003 | Allen et al. | |
| 2003/0208746 A1 * | 11/2003 | Bates | G06F 11/3664 717/129 |
| 2004/0083458 A1 | 4/2004 | Gschwinde et al. | |
| 2005/0066313 A1 * | 3/2005 | Bates | G06F 11/3648 717/129 |
| 2005/0066314 A1 * | 3/2005 | Bates | G06F 11/3644 717/129 |
| 2006/0069959 A1 | 3/2006 | Schultz | |
| 2006/0174163 A1 | 8/2006 | Gravoille et al. | |
| 2006/0190769 A1 | 8/2006 | Doddapaneni | |
| 2006/0200701 A1 | 9/2006 | Callender | |
| 2007/0011431 A1 | 1/2007 | Hogdal et al. | |
| 2008/0250397 A1 | 10/2008 | Dahms et al. | |
| 2008/0320247 A1 | 12/2008 | Morfey et al. | |
| 2010/0077385 A1 | 3/2010 | Flores Assad et al. | |
| 2010/0100715 A1 | 4/2010 | Gooding et al. | |
| 2011/0225394 A1 | 9/2011 | Mital et al. | |
| 2013/0007716 A1 * | 1/2013 | Bates | G06F 11/362 717/125 |
| 2013/0227256 A1 | 8/2013 | Robertson et al. | |

OTHER PUBLICATIONS

Magnusson et al., "Simics: A Full System Simulation Platform", IEEE, 2002, 9pg.*

Non-Final Office Action mailed Nov. 4, 2015 for U.S. Appl. No. 13/879,240, 19 pages.

Notice of Allowance mailed Jun. 6, 2016 for U.S. Appl. No. 13/879,240, 9 pages.

* cited by examiner

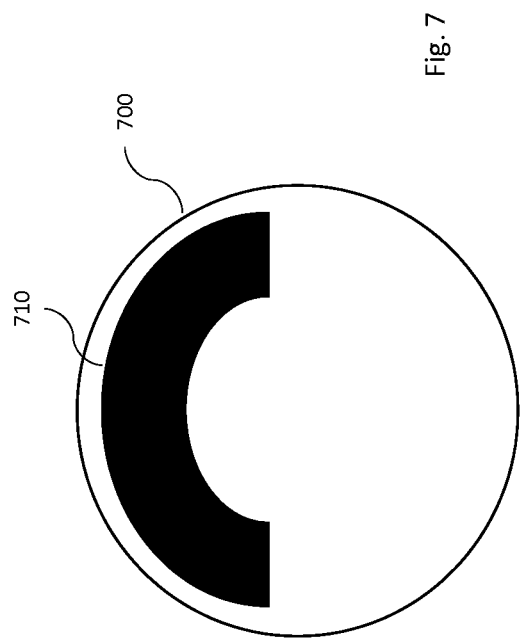

METHOD OF TESTING SOFTWARE

CROSS REFERENCE TO RELATED APPLICATION(S)

The present application claims priority to Romanian Patent Application No. RO A 2015 00065, entitled "METHOD OF TESTING SOFTWARE," filed on Jan. 29, 2015, the entirety of which is herein incorporated by reference.

FIELD OF THE INVENTION

This invention relates to a method of testing software. More in particular, this invention relates to a method of testing software using a debugger and a breakpoint handler.

BACKGROUND OF THE INVENTION

It is well known to use debuggers and breakpoint handlers to test target applications. Before execution of the application, regular breakpoints are typically inserted. When, during execution, the application encounters a breakpoint, the application stops executing and the debugger evaluates if the breakpoint matches the desired criteria, such as a specific task, processor core and/or data packet.

If the breakpoint does not match the criteria, then the application is resumed, and if the breakpoint matches, then the debugger may present the current state of the application to a user for evaluation. In either case, the execution of the target application is interrupted, resulting in a delay.

In order to avoid such a delay, U.S. Pat. No. 7,552,425 suggests to export a conditional breakpoint and a condition to be compiled for debugging. However, this requires that the application is recompiled when a breakpoint is inserted, which is often undesirable.

SUMMARY OF THE INVENTION

The present invention provides a method of testing software as described in the accompanying claims. The present invention also provides a computer program product and a system for testing software as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale. In the figures, elements which correspond to elements already described may have the same reference numerals.

FIG. 7 shows a computer readable medium comprising a computer program product of the present invention.

DETAILED DESCRIPTION OF THE PREFERRED EMBODIMENTS

Figure 1:
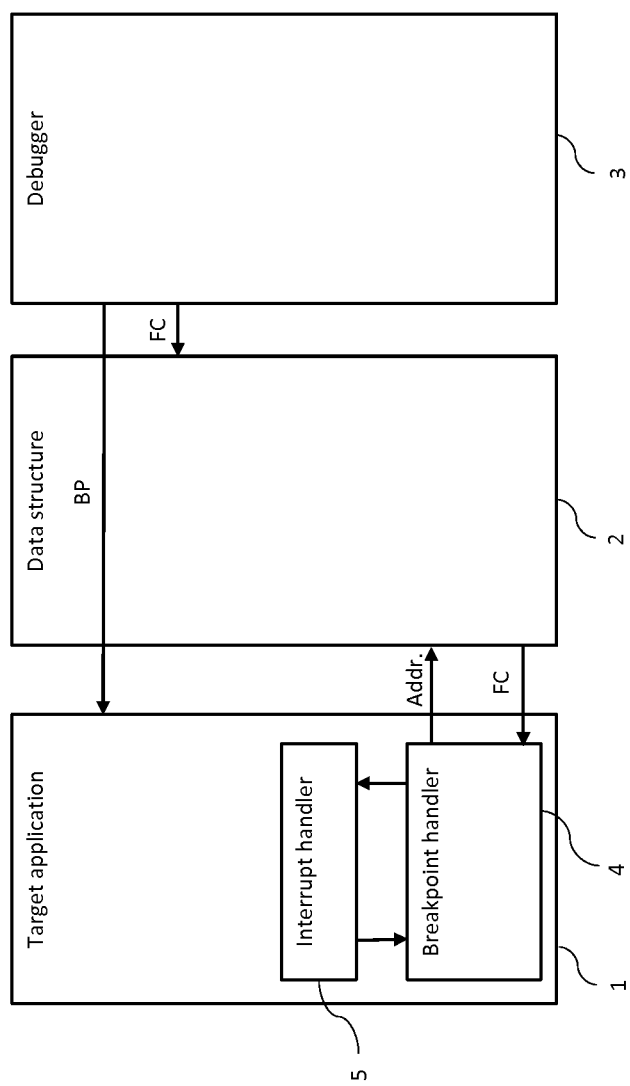
FIG. 1 schematically shows an example of an embodiment of a target application and a debugger.

An example of elements used in the present invention is schematically shown in FIG. 1. A target application 1 is shown in conjunction with a debugger 3. In the example shown, the target application 1 is shown to comprise a breakpoint handler 4 and an (optional) interrupt handler 5. In some embodiments, the interrupt handler 5 may be integral with the breakpoint handler 4, or be replaced with another mechanism.

In accordance with the present invention, a data structure 2 is used with the debugger 3. More in particular, the debugger 3 places one or more filter conditions (FC) in the data structure 2, for later retrieval by the target application using a breakpoint address (Addr.), as will later be explained with reference to FIG. 2. The debugger 3 also places at least one breakpoint (BP) in the target application 1.

Figure 2:
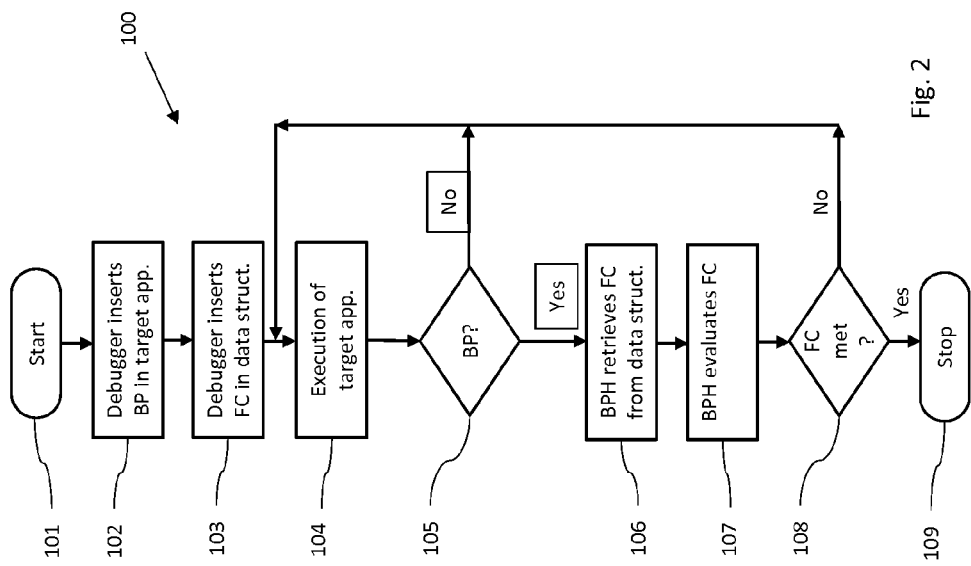
FIG. 2 schematically shows an example of an embodiment of a method of the present invention.

The embodiment of the method 100 illustrated in FIG. 2 starts in step 101, in which the method is initialised. In step 102 the debugger inserts a breakpoint (BP) in the target application (1 in FIG. 1). In step 103, the debugger inserts at least one filtering condition (FC) in the data structure (2 in FIG. 1). In step 104, the execution of the target application starts. As long as no breakpoint (BP) is encountered, the execution of the target application continues. In FIG. 2 this is illustrated by the decision step 105, in which is determined whether a breakpoint has been encountered. If this is not the case ("No"), then the execution of the target program continues with step 104. If a breakpoint has been encountered ("Yes"), then the method continues in step 106, in which the breakpoint handler (BPH) retrieves, in accordance with the invention, a filtering condition (FC) from the data structure (2 in FIG. 1). In step 107, the breakpoint handler evaluates the filtering condition. If the filtering condition is met ("Yes" in decision step 108), then the method stops in step 109, where the state of the target application is presented to a user or to a state evaluation application for automated diagnosis. If the filtering condition is not met, then the method continues with the execution of the target program in step 104.

It can therefore be seen that as long as no filtering condition is met, the method continues with the execution of the target program. In other words, the execution of the target program is not substantially interrupted by the evaluation of a breakpoint (apart from the brief evaluation by the breakpoint handler).

The data structure (2 in FIG. 1) is advantageously used to accommodate the filtering condition(s). In step 103 the debugger stores at least one filtering condition in the data structure, together with the address in the target application where the breakpoint is going to be inserted. In step 106, the breakpoint handler retrieves the filtering condition(s) from the data structure, using the address of the breakpoint as search key.

The filtering conditions stored in the data structure may contain code (that is, processor instructions). Each filtering condition may be accessed by multiple breakpoints and the code associated with the filter conditions may therefore be called common code, in contrast with private code which is not shared by the breakpoints but is specific for each breakpoint. It can thus be seen that the data structure provides a mechanism for sharing code and removes the need for injecting the same code at multiple breakpoints in the target program. In addition, by storing filtering condition evaluation code in the data structure, recompilation of the target program may be avoided.

The common code mentioned above may be designed for evaluating for any breakpoint the filtering condition retrieved from the data structure and for jumping to the private code, while the private code may comprise position independent code and code for jumping back to the target application. The common code may further be designed for restoring at least some registers affected by the breakpoint. The private code may further be designed for restoring any remaining registers affected by the breakpoint. In addition, or alternatively, the debugger may be designed for generating the private code of the breakpoint handler.

It is noted that the jump in execution from the target program to the breakpoint handler (step 105 in FIG. 2) is typically carried out by an interrupt handler (5 in FIG. 1). However, this is not essential and embodiments of the method can be envisaged in which this jump is carried out by breakpoint code in the target program, thus avoiding the need for an interrupt handler. This may, for example, be accomplished using a call instruction. However, a call instruction should typically be preceded by a register save operation and be followed by a register restore operation, which makes using a call instruction relatively complicated.

Figure 3:
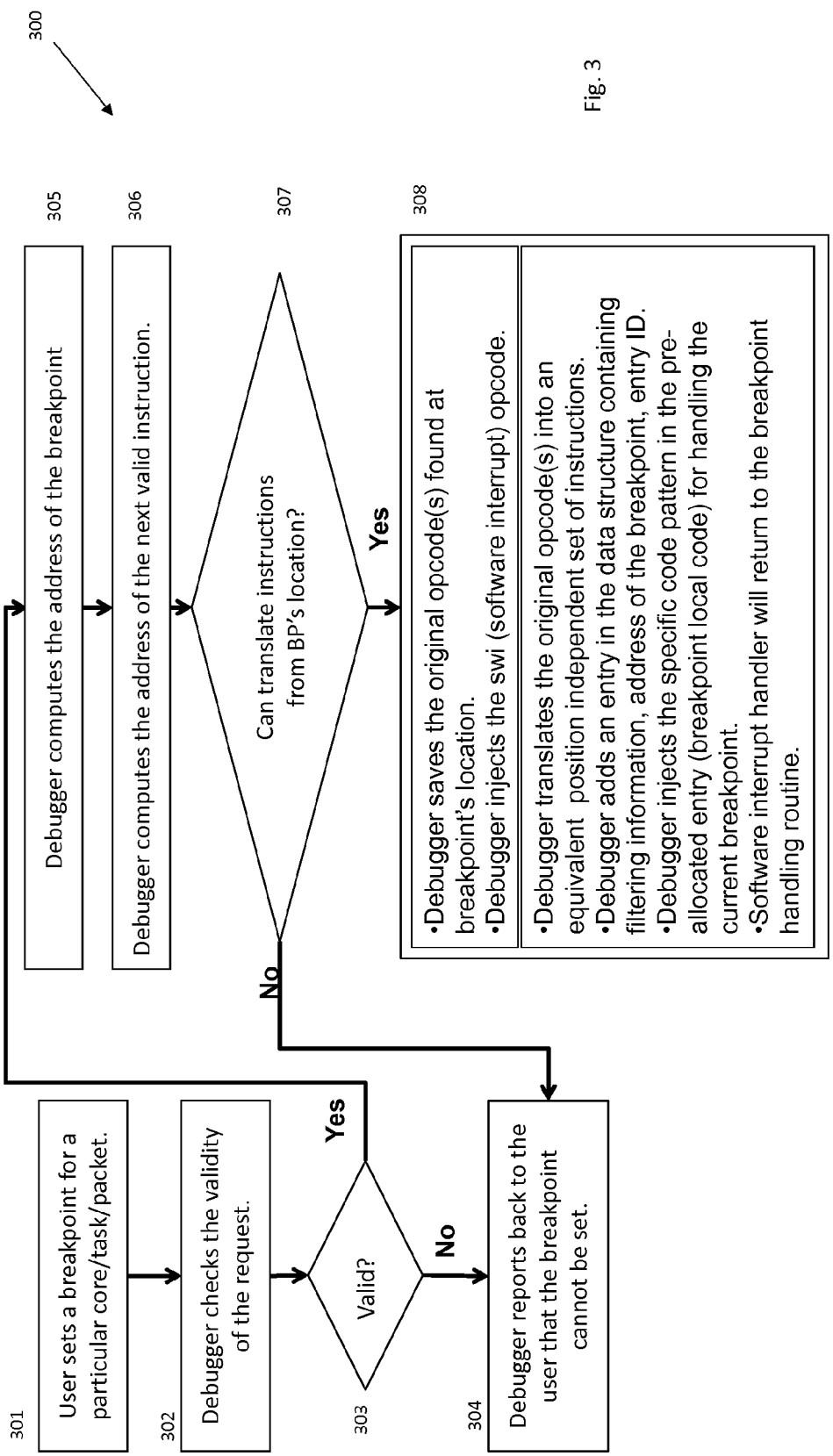
FIG. 3 schematically shows an example of an embodiment of a method of the present invention in more detail.

Details of the method of the present invention, some of which are optional, are illustrated in FIG. 3. The preparation routine 300, which may correspond with steps 101-103 of the method 100 of FIG. 2, comprises a first step 301 in which a user sets a breakpoint for a particular core, task and/or packet. It is noted that a breakpoint may be set for a particular core of a multi-core processor, and/or for a particular task running on the particular core or processor, and/or for a particular packet (such as a data communication packet) processed by the particular task, core and/or processor. The breakpoint(s) may therefore comprise a suitable identification for identifying the associated task, core, processor and/or packet.

In step 302, which may be optional in some embodiments, the debugger checks the validity of the breakpoint requests, for example by comparing the breakpoint request with allowable ranges and/or by comparing the requested core, task or packet identification with available cores, tasks and/or packets. If the outcome of the check in step 303 is negative, then in step 304 the debugger reports back to the user that the breakpoint cannot be set. If the outcome of the check is positive, then the routine continues in step 305 with the debugger computing the address of the breakpoint. In step 306, the debugger also computes the address of the next valid instruction, which will be used later to return from the breakpoint.

It is noted that the next valid instruction is the instruction following the instruction (n) where the breakpoint was inserted. However, it is possible that the jump instruction inserted is longer than the original instruction it replaces. In that case the next valid instruction may be the first instruction which is not affected by the insertion of the jump instruction. Another case in which the next valid instruction is not necessarily the next instruction is when the replace instruction (or instructions) has (or have) a delay slot.

In step 307 it is checked whether the debugger can translate the instructions from the location of the breakpoint, that is, whether the instructions which are replaced by the breakpoint can be made position-independent so as to relocate them to another memory range. If the instructions cannot be translated, then the routine ends in step 304, which was described above. If the instructions can be translated, then the routine continues with step 308, in which several actions are taken.

In step 308, the debugger saves the original instructions (opcodes) at the memory location where the breakpoint is to be inserted, and replaces these instructions with new instructions which allow a software interrupt ("swi"), so the so-called swi opcode. The debugger then translates the original instructions into position independent instructions. The debugger also creates an entry in the data structure (2 in FIG. 1). This entry may comprise filtering information, the address of the breakpoint and an identification of the entry (entry ID). The debugger then produces a specific set of instructions (code pattern) in the entry for handling the breakpoint. These instructions may later be fetched by a (software) interrupt handler.

Figure 4:
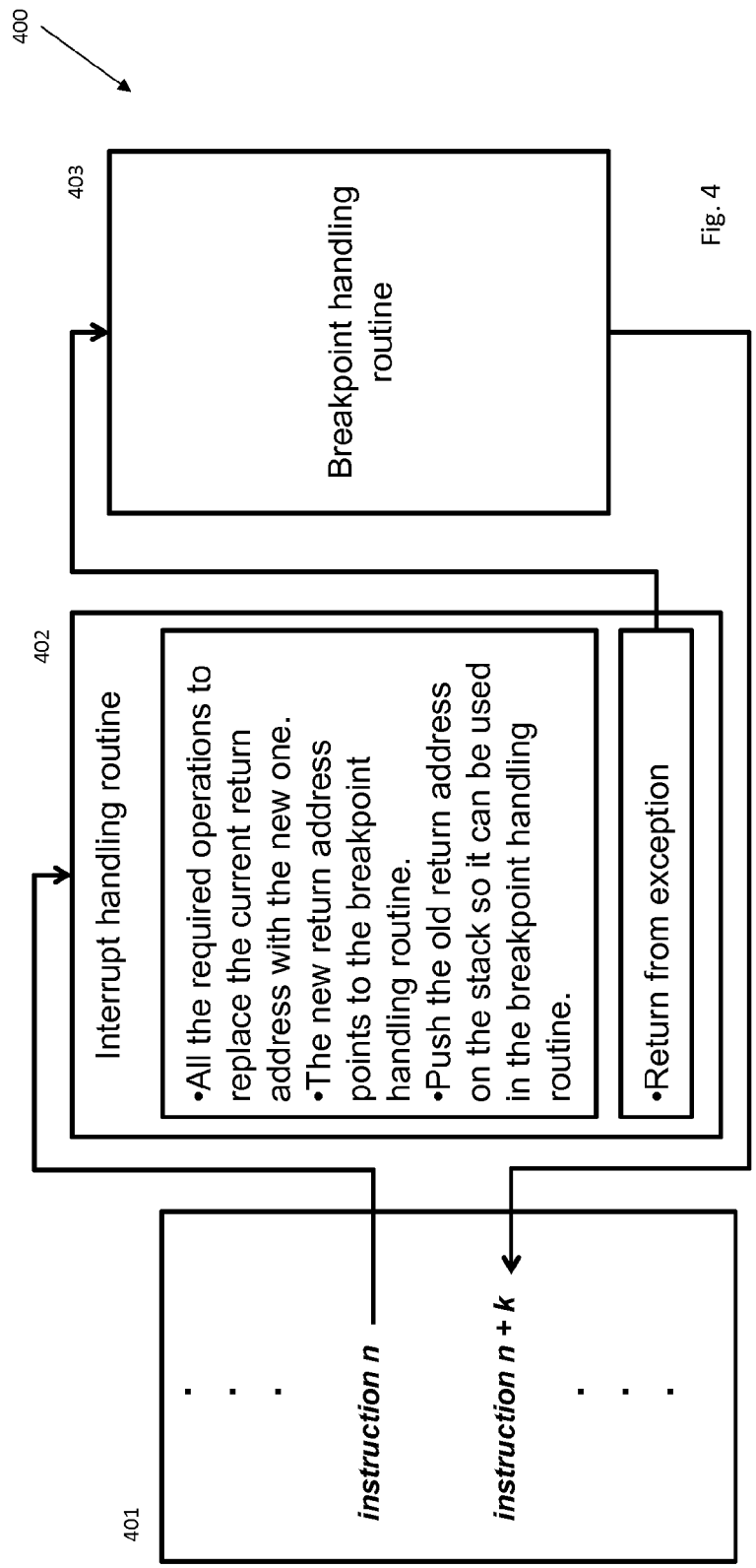
FIG. 4 schematically shows an example of an embodiment of a method of the present invention in more detail.

An example of the use of an interrupt handling routine is schematically illustrated in FIG. 4. The routine 400 includes jumps from a target application 401 via an interrupt handling routine 402 to a breakpoint handling routine 403 and from there back to the target application 401.

The target application 401, which may correspond with the target application 1 of FIG. 1, comprises an instruction n at which a breakpoint is set (where n represents a memory address). That is, the instruction n is replaced (by the debugger) with an instruction which causes the execution to jump to the interrupt handling routine 402. Several operations may be carried out by the interrupt handling routine, such as updating the return address of the routine 402 to allow a further jump to the breakpoint handling routine 403. The old return address is saved on the stack for use by the breakpoint handling routine 403. As a result, the interrupt handling routine "returns" not to the target application 401 but to the breakpoint handling routine 403.

Figure 5:
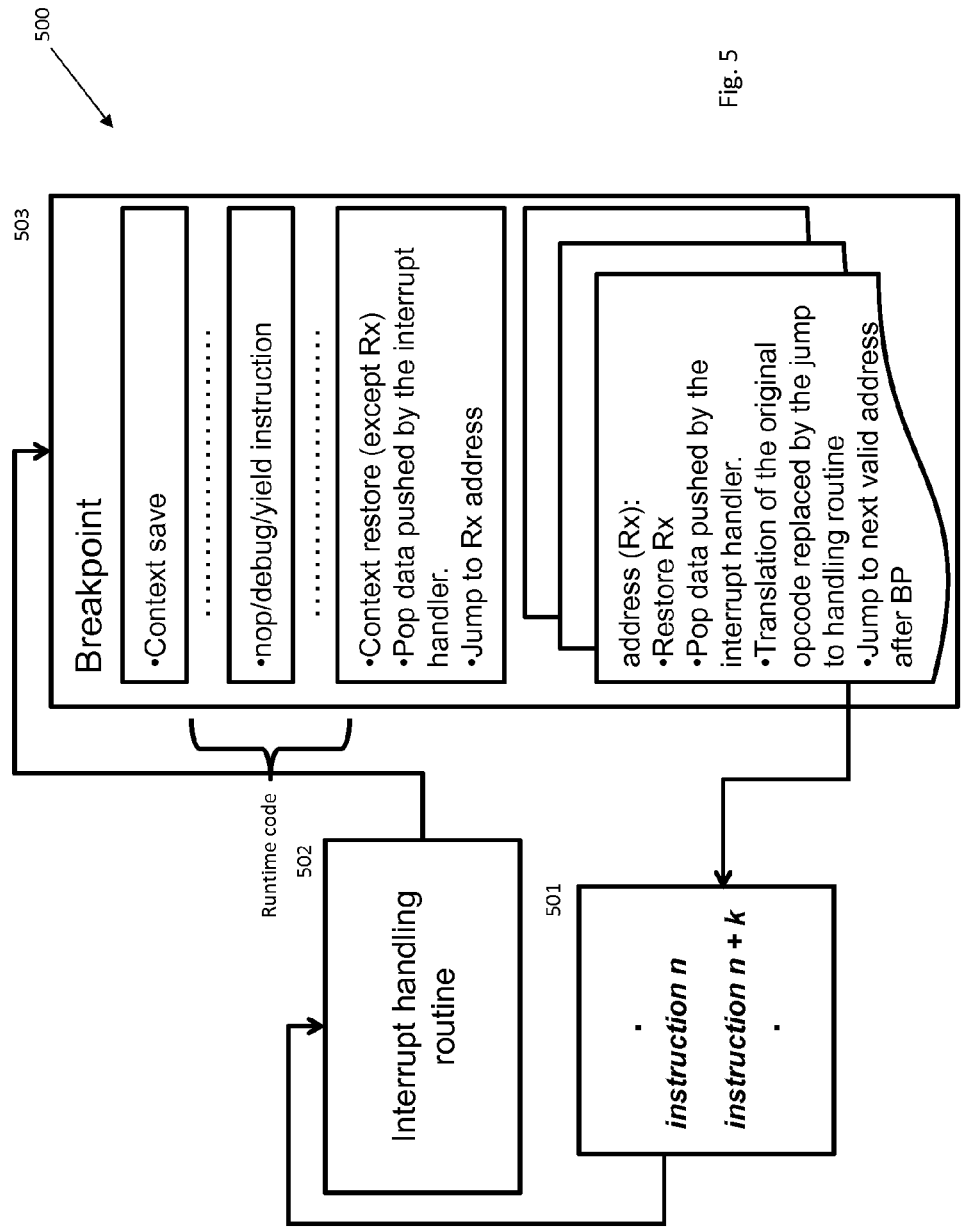
FIG. 5 schematically shows an example of an embodiment of a method of the present invention in more detail.

The operation of the breakpoint handling routine is explained in more detail in FIG. 5, where the sequence 500 is shown to comprise a target program 501 (which may correspond with the target program 401 of FIG. 4), an interrupt handling routine 502 (which may correspond to the interrupt handling routine 402 of FIG. 4) and a breakpoint handling routine 503 (which may correspond to the breakpoint handling routine 403 of FIG. 4).

The breakpoint handling routine 503 is shown to first save the context, that is, to save the contents of processor registers and memory locations which are likely to be affected by the routine. Then the breakpoint handling routine carries out a number of instructions that evaluate the filter conditions. These conditions, which were specified by a user and stored in the data structure (2 in FIG. 1) by the debugger (3 in FIG. 1), are now evaluated in runtime. The evaluation was discussed above with reference to FIG. 2. It is shown in FIG. 5 that the breakpoint handling routine comprises a null instruction, which may be called nop, debug or yield by different processor manufacturers. This instruction, when executed, effectively causes a processor to do nothing and can be used to put a processor in a waiting mode.

The null instruction may be preceded and/or followed by other instructions which, together with the null instruction, constitute runtime code which evaluates the filtering condition. This evaluation is based upon user selected information stored in the data structure and the breakpoint location saved by the interrupt handler, if an interrupt handler is used.

In the present case, the null instruction may be executed when the filter condition is met, so the control is passed to the debugger (which may wait for user input) and the execution of the application is suspended. If the condition is not met, the execution of the breakpoint handing routine 503 continues with restoring the context, that is, restoring the processor registers (with possibly one exception as a register may be necessary for the return address) to the state they were in before the jump to the interrupt handling routine 501.

A jump may be made to the memory location indicated by the register Rx, which was not restored. At that memory location, code is stored which allows the original content of the register Rx to be restored (which is possible after the jump was made), code which allows the data stored by the interrupt handler on the stack to be retrieved ("popped"), and code which represents the location-independent version of the code replaced by the jump in the target application (from instruction n until, but not including, instruction n+k). Further code allows jumping back, after completion of the breakpoint handling routine 503, to the next valid memory address after the breakpoint. This next valid memory address is labelled instruction n+k in FIG. 5.

It is noted that the location-independent code, which is obtained by translating the original code at the breakpoint address, may be modified in some cases so as to make it location-independent. For example, a short (relative) branch instruction may have to be translated into a long jump instruction.

The breakpoint handling routine 503 may have multiple entries. The number of entries may be equal to the number of supported breakpoints. Each entry may contain code which may be referred to as breakpoint private code.

Figure 6:
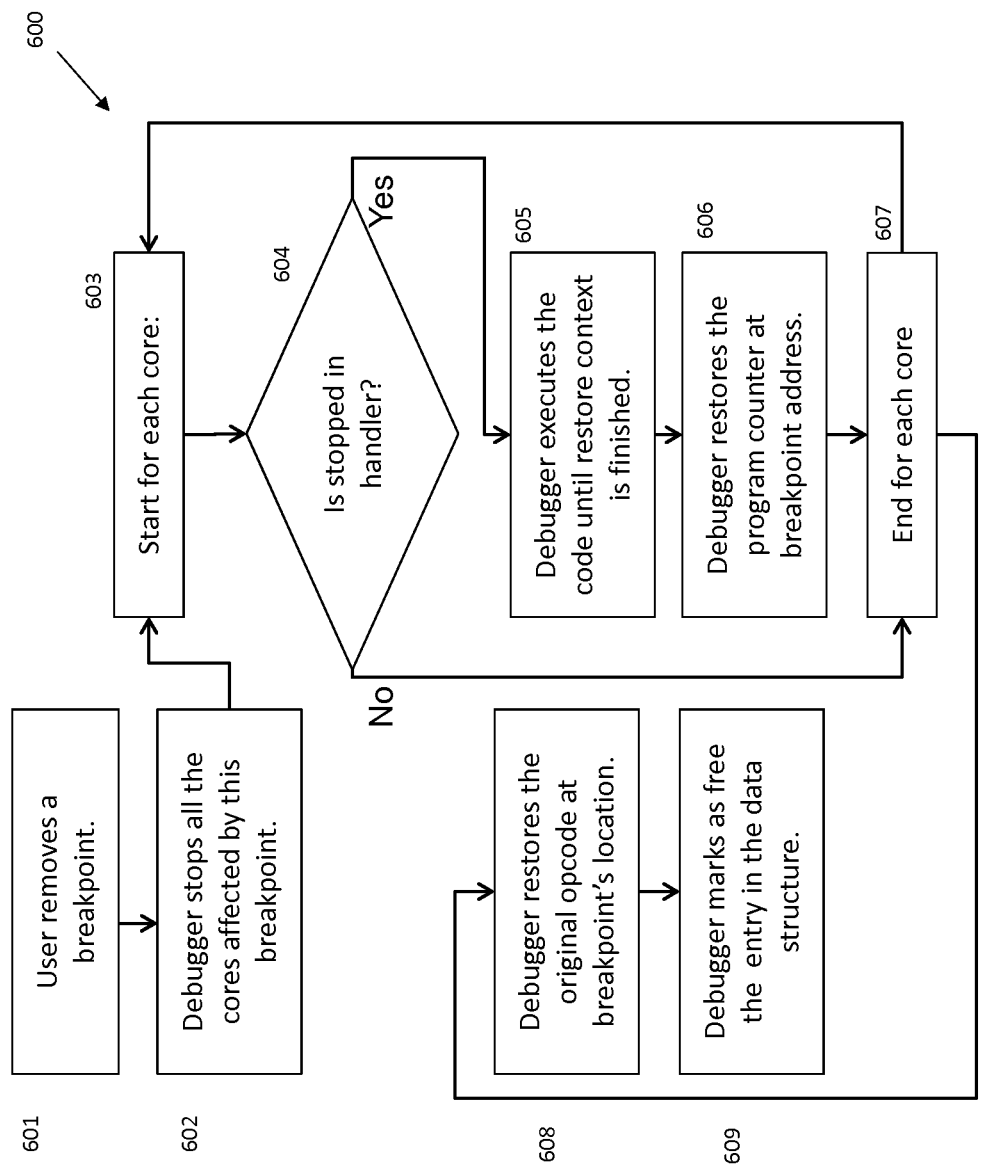
FIG. 6 schematically shows an example of an embodiment of a method of the present invention in more detail.

The removal of a breakpoint is schematically illustrated in FIG. 6, where the procedure 600 is shown to start with a step 601 in which a user removes a breakpoint. In response, the debugger stops all processors or processor cores affected by this breakpoint in step 602. The stopping sequence is initiated in step 603, where for each processor or processor core it is checked in step 604 whether the execution is stopped in the breakpoint handler. If this is the case, then the procedure continues with step 605 in which the debugger executes the remaining instructions until the context restore (see step 503 in FIG. 5) is completed, as otherwise the processor or core could be left in an undefined state. In step 606, the debugger restores the program counter to point at the breakpoint address (instruction n in FIGS. 4 & 5), after which the execution ends at each processor or core in step 607. It is noted that when the test fails in step 604, meaning that the execution is not stopped in the breakpoint handler, then the procedure jumps directly from step 604 to step 607.

In step 608, the debugger restores the original instructions (opcodes) at the location of the breakpoint (instruction n) and in step 609 the debugger clears the entry in the data structure (2 in FIG. 1).

Accordingly, the invention provides a method of testing software using a debugger and a breakpoint handle, wherein the debugger:
  inserts a breakpoint in a target application, and
  enters at least one filtering condition associated with the breakpoint in a data structure,
  wherein, when during execution the target application encounters a breakpoint at a certain address, the target application:
  transfers execution to the breakpoint handler,
  and wherein the breakpoint handler:
  uses the address to retrieve filtering conditions from the data structure,
  executes code for evaluating the filtering condition, and
  transfers execution back to the target application if the filtering condition is not met.

It can be seen that the filtering condition of the breakpoint is evaluated by the application at execution time. That is, the filtering condition of the breakpoint is not evaluated by the debugger but by the application, with the aid of the data structure. Also, the filtering conditions are evaluated during the execution of the application.

As the execution is transferred back to the application if the filtering condition is not met, the application resumes its normal execution, which was barely delayed by the filtering condition evaluation. It will be understood that when the filtering condition is met, execution may not be transferred back to the application as further inspection of the filtering conditions and the state of the application may be required.

FIG. 7 shows a computer readable medium 700 comprising a computer program product 710, the computer program product comprising instructions for causing a processor apparatus to perform a method of testing software. The computer program product 710 may further comprise comprising instructions for causing a processor system to perform a method of testing software using a debugger and a breakpoint handler, in which product the debugger instructions are configured for:
  inserting a breakpoint in a target application,
  entering at least one filtering condition associated with the breakpoint in a data structure, and
  causing, when during execution the target application encounters a breakpoint at a certain address, the target application to transfer execution to the breakpoint handler,
  and in which product the breakpoint handler instructions are configured for:
  using the address to retrieve filtering conditions from the data structure,
  executing code for evaluating the filtering condition, and
  transferring execution back to the target application if the filtering condition is not met.

The computer program product may be embodied on the computer readable medium 700 as physical marks or by means of magnetization of the computer readable medium 700. However, any other suitable embodiment is conceivable as well. Furthermore, it will be appreciated that, although the computer readable medium 700 is shown in FIG. 7 as an optical disc, the computer readable medium 700 may be any suitable computer readable medium, such as a hard disk, solid state memory, flash memory, etc., and may be non-recordable or recordable. The computer readable medium may be a non-transitory tangible computer readable storage medium.

The invention may accordingly be implemented in a computer program for running on a computer system, at least including code portions for performing steps of a method according to the invention when run on a programmable apparatus, such as a computer system or enabling a programmable apparatus to perform functions of a device or system according to the invention. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system. The computer program may be provided on a data carrier, such as a CD ROM or diskette, stored with data loadable in a memory of a computer system, the data representing the computer program.

The data carrier may further be a data connection, such as a telephone cable or a wireless connection.

The present invention may also be implemented in a system for testing and/or debugging software, the system involving a debugger and a breakpoint handler. The system may comprise further components, such as suitable processor components and memory components for enabling the testing method described above.

In the foregoing specification, the invention has been described with reference to specific examples of embodiments of the invention. It will, however, be evident that various modifications and changes may be made therein without departing from the scope of the invention as set forth in the appended claims. For example, the connections may be any type of connection suitable to transfer signals from or to the respective nodes, units or devices, for example via intermediate devices. Accordingly, unless implied or stated otherwise the connections may for example be direct connections or indirect connections.

Devices functionally forming separate devices may be integrated in a single physical device. Also, the units and circuits may be suitably combined in one or more semiconductor devices.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A method of testing software of a target application using a debugger and a breakpoint handler comprising:
   inserting, by the debugger, a first breakpoint in the target application;
   entering, by the debugger, at least one filtering condition associated with the first breakpoint in a data structure;
   transferring execution by the target application to the breakpoint handler when during execution the target application encounters the first breakpoint at an address;
   retrieving, by the breakpoint handler, a filtering condition from the data structure based upon the address;
   evaluating, by the breakpoint handler, the filtering condition to determine if the filtering condition is met, and
   executing, by the breakpoint handler, a first code and a second code if the filtering condition is not met, wherein the first code is breakpoint code of the first breakpoint and a second breakpoint, and the second code is breakpoint code of the first breakpoint and not breakpoint code of the second breakpoint, wherein the second code comprises position independent code and code for jumping back to the target application.

2. The method according to claim 1, wherein evaluating the filtering condition comprises executing the first code, and wherein based upon the evaluation the first code implements a jump to the second code.

3. The method according to claim 2, further comprising: restoring at least some registers affected by the first breakpoint.

4. The method according to claim 2, further comprising: restoring, by the second code, any remaining registers affected by the first breakpoint.

5. The method according to claim 1, further comprising: generating, by the debugger, the second code of the breakpoint handler.

6. The method according to claim 1, further comprising: translating, by the debugger, original code replaced with the first breakpoint into the position independent code.

7. The method according to claim 6, further comprising: invoking, by the debugger, a disassembler for identifying and, if necessary, changing instructions of the original code.

8. The method according to claim 1, further comprising: transferring execution to the breakpoint handler via an interrupt handler, which interrupt handler passes the address of the first breakpoint to the breakpoint handler.

9. The method according to claim 1, further comprising: stopping execution of the target application if the filtering condition is met.

10. The method according to claim 1, further comprising: entering in the data structure, together with each filtering condition associated with the first breakpoint, an identification of the second code entry.

11. The method according to claim 1, further comprising: transferring execution to the breakpoint handler via an interrupt handler.

12. A computer program product, not comprising transitory media, comprising instructions for causing a processor system to perform a method of testing software using a debugger and a breakpoint handler,
   the breakpoint handler comprises a first code and a second code, wherein the first code is breakpoint code of a first breakpoint and a second breakpoint, and the second code is breakpoint code of the first breakpoint and not breakpoint code of the second breakpoint, wherein the second code comprises position independent code and code for jumping back to a target application,
   the debugger instructions of the product are configured for:
      inserting the first breakpoint in the target application,
      entering at least one filtering condition associated with the first breakpoint in a data structure, and
      causing, when during execution the target application encounters first breakpoint at a certain address, the target application to transfer execution to the breakpoint handler,
   and in which product the breakpoint handler instructions are configured for:
      using the address to retrieve filtering conditions from the data structure,
      executing code for evaluating the filtering condition, and
      executing the second code if the filtering condition is not met.

13. A system for testing software, executing on a processor of a computer system, using a debugger and a breakpoint handler,
- wherein the breakpoint handler comprises a first code and a second code, wherein the first code is breakpoint code of a first breakpoint and a second breakpoint and the second code is breakpoint code of the first breakpoint and not breakpoint code of the second breakpoint,
- wherein the second code comprises position independent code and code for jumping back to a target application,
- wherein the debugger is configured for:
  - inserting the first breakpoint in the target application,
  - entering at least one filtering condition associated with the first breakpoint in a data structure, and
  - causing, when during execution the target application encounters the first breakpoint at an address, the target application transfers execution to the breakpoint handler,
- and wherein the breakpoint handler is configured for:
  - using the address to retrieve filtering conditions from the data structure,
  - executing code for evaluating the filtering condition, and
  - executing the second code if the filtering condition is not met.

14. The method according to claim 3, further comprising:
- restoring any remaining registers affected by the first breakpoint.

* * * * *